US012761357B2

(12) United States Patent
Yao et al.

(10) Patent No.: US 12,761,357 B2
(45) Date of Patent: Oct. 13, 2026

(54) LOCALIZATION METHOD AND APPARATUS, COMPUTER APPARATUS AND COMPUTER READABLE STORAGE MEDIUM

(71) Applicant: JINGDONG TECHNOLOGY INFORMATION TECHNOLOGY CO., LTD., Beijing (CN)

(72) Inventors: Xiujun Yao, Beijing (CN); Chenguang Gui, Beijing (CN); Jiannan Chen, Beijing (CN); Fuqiang Ma, Beijing (CN); Chao Wang, Beijing (CN); Lihua Cui, Beijing (CN); Feng Wang, Beijing (CN)

(73) Assignee: JINGDONG TECHNOLOGY INFORMATION TECHNOLOGY CO., LTD., Beijing (CN)

( * ) Notice: Subject to any disclaimer, the term of this patent is extended or adjusted under 35 U.S.C. 154(b) by 715 days.

(21) Appl. No.: 18/257,754

(22) PCT Filed: Dec. 17, 2021

(86) PCT No.: PCT/CN2021/138982

§ 371 (c)(1),
(2) Date: Jun. 15, 2023

(87) PCT Pub. No.: WO2022/156447

PCT Pub. Date: Jul. 28, 2022

(65) Prior Publication Data

US 2024/0118419 A1 Apr. 11, 2024

(30) Foreign Application Priority Data

Jan. 20, 2021 (CN) ........................ 202110074516.0

(51) Int. Cl.
*G01S 17/86* (2020.01)
*G01S 17/89* (2020.01)
(Continued)

(52) U.S. Cl.
CPC .............. *G01S 17/86* (2020.01); *G01S 17/89* (2013.01); *G06F 16/29* (2019.01); *G06T 7/74* (2017.01); *G06T 2207/30241* (2013.01)

(58) Field of Classification Search
CPC .......... G01S 17/86; G01S 17/89; G06F 16/29; G06T 2207/10044; G06T 2207/30241; G06T 2207/30244; G06T 7/74; G06T 7/30
(Continued)

(56) References Cited

U.S. PATENT DOCUMENTS

| | | | |
|---|---|---|---|
| 10,789,771 | B2 | 9/2020 | Zhou et al. |
| 11,216,973 | B2 | 1/2022 | Kitajima et al. |
| 2020/0206945 | A1 | 7/2020 | Xiong et al. |

(Continued)

FOREIGN PATENT DOCUMENTS

| | | | |
|---|---|---|---|
| CN | 107123142 | A | 9/2017 |
| CN | 107300917 | A | 10/2017 |

(Continued)

OTHER PUBLICATIONS

Zhang, Y., Zhang, H., Xiong, Z., & Sheng, X. (Jul. 2019). A visual slam system with laser assisted optimization. In 2019 IEEE/ASME International Conference on Advanced Intelligent Mechatronics (AIM) (pp. 187-192). IEEE. (Year: 2019).*

(Continued)

*Primary Examiner* — Chineyere Wills-Burns
*Assistant Examiner* — Emmanuel Silva-Avina
(74) *Attorney, Agent, or Firm* — Myers Bigel, P.A.

(57) ABSTRACT

The present disclosure relates to a localization method and apparatus, and a computer apparatus and a computer-read-
(Continued)

able storage medium. The localization method includes performing radar mapping and visual mapping by respectively using a radar and a vision sensor, wherein a step of the vision mapping includes determining a pose of a key frame; and combining radar localization with vision localization based on the pose of the key frame, to use vision localization results for navigation on a map obtained by the radar mapping.

18 Claims, 5 Drawing Sheets

(51) Int. Cl.
*G06F 16/29* (2019.01)
*G06T 7/73* (2017.01)

(58) Field of Classification Search
USPC .......................................................... 382/154
See application file for complete search history.

(56) References Cited

U.S. PATENT DOCUMENTS

| | | | | |
|---|---|---|---|---|
| 2020/0226782 | A1 * | 7/2020 | Li | G06T 7/74 |
| 2020/0312029 | A1 | 10/2020 | Heinen et al. | |
| 2021/0149413 | A1 | 5/2021 | Sohn et al. | |

FOREIGN PATENT DOCUMENTS

| | | | | | |
|---|---|---|---|---|---|
| CN | 108072370 | A | | 5/2018 | |
| CN | 108717710 | A | | 10/2018 | |
| CN | 109084732 | A | * | 12/2018 | G01C 11/00 |
| CN | 110261870 | A | | 9/2019 | |
| CN | 110533722 | A | * | 12/2019 | G06T 7/80 |
| CN | 110796683 | A | | 2/2020 | |
| CN | 111045017 | A | | 4/2020 | |
| CN | 111815716 | A | | 10/2020 | |
| CN | 112785702 | A | * | 5/2021 | G06T 17/05 |
| JP | 2019145089 | A | | 8/2019 | |
| JP | 2020144710 | A | | 9/2020 | |
| KR | 20180135755 | A | | 12/2018 | |

OTHER PUBLICATIONS

"Notice of Reasons for Refusal" and English translation, JP Application No. 2023-518845, Sep. 2, 2025, 9 pp.
Takashi, Kakuta, "Mobile Mapping System" and English translation, Mitsubishi Electric Technical Review, Mitsubishi Electric Engineering Co., Ltd., vol. 81, No. 8, Jan. 25, 2007, pp. 15-18.
Xu, et al., "SLAM of Robot based on the Fusion of Vision and LIDAR", Proceedings of the 2018 IEEE International Conference on Cyborg and Bionic Systems, Shenzhen, China, Oct. 25, 2018, pp. 121-126.
"International Search Report and English language translation", International Application No. PCT/CN2021/138982, Mar. 16, 2022, 6 pp.
"First Examination Report Notification and English language translation", CN Application No. 202110074516.0, Dec. 9, 2024, 24 pp.
Mur-Artal, et al., "Orb-Slam: A Versatile and Accurate Monocular SLAM System", IEEE Transactions on Robotics, vol. 31, No. 5, Oct. 2015, pp. 1147-1163.

* cited by examiner

LOCALIZATION METHOD AND APPARATUS, COMPUTER APPARATUS AND COMPUTER READABLE STORAGE MEDIUM

CROSS-REFERENCE TO RELATED APPLICATIONS

The present application is a U.S. National Stage Application under 35 U.S.C. § 371 of International Patent Application PCT/CN2021/138982, filed on Dec. 17, 2021, which itself claims priority to China Patent Application No. 202110074516.0 filed on Jan. 20, 2021, the disclosures of both of which are incorporated by reference herein in their entireties.

TECHNICAL FIELD

The present disclosure relates to the field of localization, in particular to a localization method and apparatus, a computer apparatus and a computer readable storage medium.

BACKGROUND

For a lidar-based indoor localization technology, lidar is widely applied in indoor localization of mobile robot due to its accurate ranging information. Localization through matching laser data with a grid map is a current mainstream localization method. That is, a search window is opened in the vicinity of a current pose obtained by prediction, and several candidate poses are created inside the search window, to determine the current most suitable localization pose according to a matching score.

For vision-based indoor localization technology, vision-based localization is also known as visual SLAM (Simultaneous Localization and Mapping) technology. The visual SLAM applies the theory of multiple view geometry, to localize the camera and simultaneously construct a map of the surrounding environment according to the image information captured by the camera. The visual SLAM technology mainly comprises vision odometer, back-end optimization, loop detection and mapping, wherein, vision odometer studies the transformation relationship between image frames to complete real-time pose tracking, processes the input image, calculates the attitude change, and obtains the motion relationship between the cameras. However, as time accumulates, errors will accumulate, which is caused by only estimating the motion between two images. The back end mainly uses optimization methods to reduce the error of the overall frame comprising camera poses and spatial map points. The loop detection, also known as closed-loop detection, mainly uses the similarity between images to determine whether a previous position has been reached, to eliminate the accumulated errors and obtain a globally consistent trajectory and map. For mapping, a map corresponding to the task requirements is created according to the estimated trajectory.

SUMMARY

According to one aspect of the present disclosure, a localization method is provided. The method comprises the steps of: performing radar mapping and vision mapping by respectively using a radar and a vision sensor, wherein a step of the vision mapping comprises determining a pose of a key frame; and combining radar localization with vision localization based on the pose of the key frame, to use vision localization results for navigation on a map obtained by the radar mapping.

In some embodiments of the present disclosure, the performing radar mapping and vision mapping by using a radar and a vision sensor comprises: performing mapping by simultaneously using the radar and the vision sensor, wherein a map for localization and navigation is obtained by the radar mapping, and a vision map is obtained by the vision mapping; and binding the pose of the key frame provided by the vision mapping with a radar pose provided by the radar mapping.

In some embodiments of the present disclosure, the combining radar localization with vision localization based on the pose of the key frame, to use vision localization results for navigation on a map obtained by the radar mapping comprises: determining a pose of a candidate key frame and a pose of a current frame under a vision trajectory; transforming the pose of the candidate key frame and the pose of the current frame under the vision trajectory to a pose of the candidate key frame and a pose of the current frame under a radar trajectory; determining a pose transformation matrix from the candidate key frame to the current frame under the radar trajectory according to the pose of the candidate key frame and the pose of the current frame under the radar trajectory; and determining a preliminary pose of a navigation object under the radar trajectory according to the pose transformation matrix and a radar pose bound with the pose of the key frame.

In some embodiments of the present disclosure, the combining radar localization with vision localization based on the pose of the key frame, to use vision localization results for navigation on a map obtained by the radar mapping further comprises: determining the pose of the navigation object in a coordinate system of a grid map by projecting the preliminary pose of the navigation object with six degrees of freedom onto a preliminary pose of the navigation object with three degrees of freedom.

In some embodiments of the present disclosure, the determining the pose of the current frame under the vision trajectory comprises: loading a vision map; extracting feature points from an image of the current frame of the vision map; searching for the candidate key frame in a mapping database according to a descriptor of the image of the current frame; and performing vision relocation according to the candidate key frame and information of feature points of the current frame, to obtain the pose of the current frame under the vision trajectory.

In some embodiments of the present disclosure, the determining the pose of the candidate key frame under the vision trajectory comprises: determining the pose of the candidate key frame under the vision trajectory according to a rotation matrix of the candidate key frame under the vision trajectory and a global position of the candidate key frame under the vision trajectory.

In some embodiments of the present disclosure, the transforming the pose of the candidate key frame under the vision trajectory to the pose of the candidate key frame under the radar trajectory comprises: determining a rotation matrix of the candidate key frame under the radar trajectory according to a rotation matrix of the candidate key frame under the vision trajectory and an extrinsic parameter rotation matrix between the vision sensor and the radar; calculating a rotation matrix between the vision trajectory and the radar trajectory; determining a global position of the candidate key frame under the radar trajectory according to a global position of the candidate key frame under the vision trajectory and the rotation matrix between the vision trajectory and the radar trajectory; and determining the pose of the candidate key frame under the radar trajectory according to the global position of the candidate key frame under the radar trajectory and the rotation matrix of the candidate key frame under the radar trajectory.

In some embodiments of the present disclosure, the determining a rotation matrix of the candidate key frame under the radar trajectory according to a rotation matrix of the candidate key frame under the vision trajectory and an extrinsic parameter rotation matrix between the vision sensor and the radar comprises: determining the pose of the candidate key frame under the vision trajectory according to the rotation matrix of the candidate key frame under the vision trajectory and the global position of the candidate key frame under the vision trajectory; and determining the rotation matrix of the candidate key frame under the radar trajectory according to the rotation matrix of the candidate key frame under the vision trajectory and the extrinsic parameter rotation matrix between the vision sensor and the radar.

In some embodiments of the present disclosure, the transforming the pose of the current frame under the vision trajectory to the pose of the current frame under the radar trajectory comprises: determining a rotation matrix of the current frame under the radar trajectory according to a rotation matrix of the current frame under the vision trajectory and an extrinsic parameter rotation matrix between the vision sensor and the radar; calculating a rotation matrix between the vision trajectory and the radar trajectory; determining a global position of the current frame under the radar trajectory according to a global position of the current frame under the vision trajectory and the rotation matrix between the vision trajectory and the radar trajectory; and determining the pose of the current frame under the radar trajectory according to the global position of the current frame under the radar trajectory and the rotation matrix of the current frame under the radar trajectory.

According to another aspect of the present disclosure, a localization apparatus is provided. The device comprises: a fused mapping module configured to perform radar mapping and vision mapping by respectively using a radar and a vision sensor, wherein a step of the vision mapping comprises determining a pose of a key frame; and a fused localization module configured to combine radar localization with vision localization based on the poses of the key frames, to use vision localization results for navigation on a map obtained by the radar mapping.

In some embodiments of the present disclosure, the fused mapping module is configured to perform mapping by simultaneously using the radar and the vision sensor, wherein a map for localization and navigation is obtained by the radar mapping, and a vision map is obtained by the vision mapping; and bind the pose of the key frame provided by the vision mapping with a radar pose provided by the radar mapping.

In some embodiments of the present disclosure, the fused localization module is configured to determine a pose of a candidate key frame and a pose of a current frame under a vision trajectory; transform the pose of the candidate key frame and the pose of the current frame under the vision trajectory to a pose of the candidate key frame and a pose of the current frame under a radar trajectory; determine a pose transformation matrix from the candidate key frame to the current frame under the radar trajectory according to the pose of the candidate key frame and the pose of the current frame under the radar trajectory; and determine a preliminary pose of a navigation object under the radar trajectory according to the pose transformation matrix and a radar pose bound with the pose of the key frame.

In some embodiments of the present disclosure, the fused localization module is further configured to determine the pose of the navigation object in a coordinate system of a grid map by projecting the preliminary pose of the navigation object with six degrees of freedom onto a preliminary pose of the navigation object with three degrees of freedom.

In some embodiments of the present disclosure, the localization apparatus is configured to perform the operations of implementing the localization method according to any one of the above-described embodiments.

According to another aspect of the present disclosure, a computer apparatus is provided. The device comprises: a memory configured to store instructions; and a processor configured to execute instructions, so that the computer apparatus performs the operations of implementing the localization method according to any one of the above-described embodiments.

According to another aspect of the present disclosure, a non-transitory computer readable storage medium is provided, wherein the computer readable storage medium stores computer instructions that, when executed by a processor, implement the localization method according to any one of the above-described embodiments.

BRIEF DESCRIPTION OF THE ACCOMPANYING DRAWINGS

In order to more explicitly explain the embodiments of the present disclosure or the technical solutions in the relevant art, a brief introduction will be given below for the accompanying drawings required to be used in the description of the embodiments or the relevant art. It is obvious that, the accompanying drawings described as follows are merely some of the embodiments of the present disclosure. For those skilled in the art, other accompanying drawings may also be obtained according to such accompanying drawings on the premise that no inventive effort is involved.

DETAILED DESCRIPTION

Figure 1:
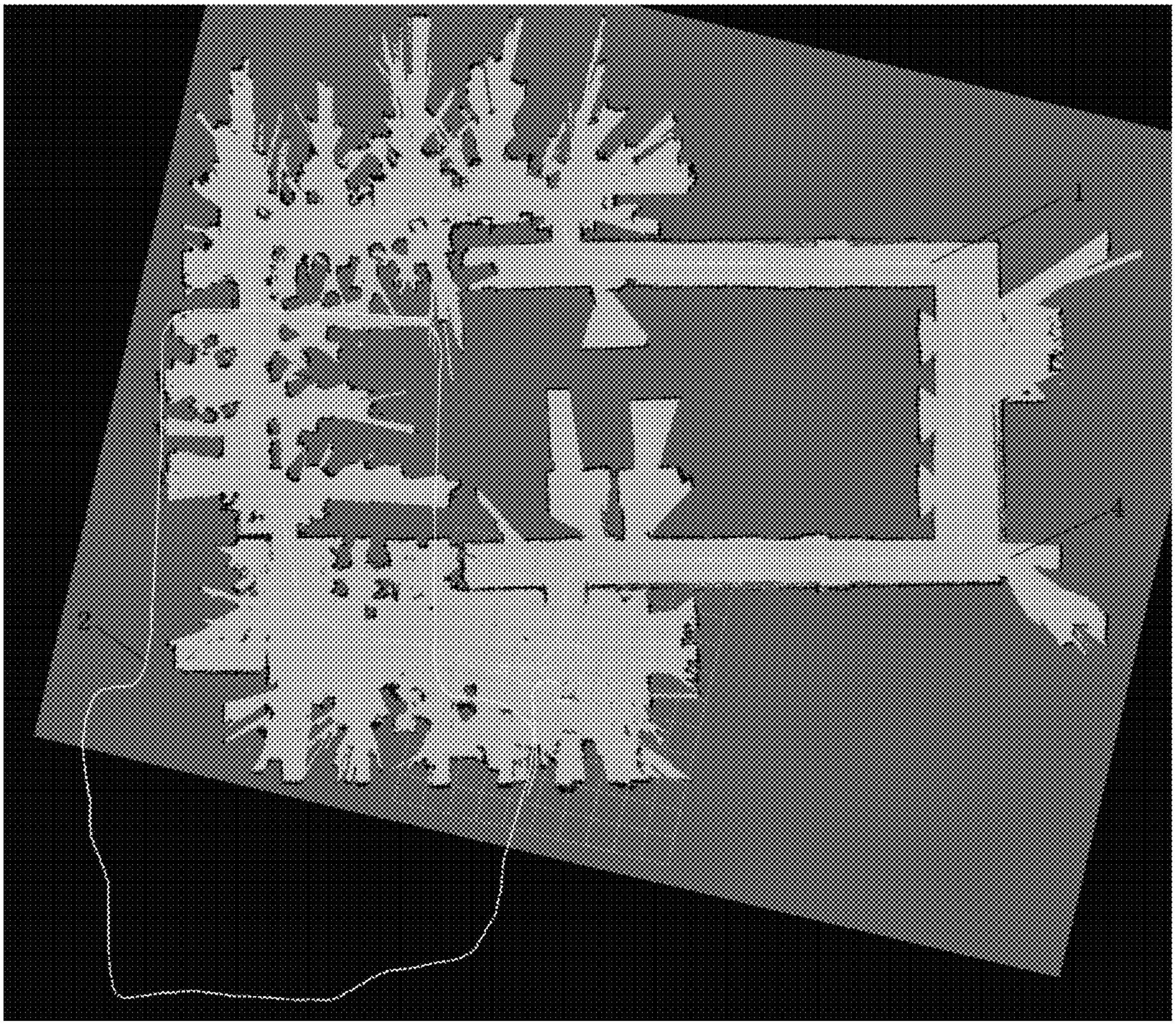
FIG. 1 is a schematic view of a trajectory and a grid map that are visualized by simultaneously using the radar mapping and the vision mapping on a same navigation object.

The technical solution in the embodiments of the present disclosure will be explicitly and completely described below in conjunction with the accompanying drawings in the embodiments of the present disclosure. Apparently, the embodiments described are merely some of the embodiments of the present disclosure, rather than all of the embodiments. The following descriptions of at least one exemplary embodiment which are in fact merely illustrative, shall by no means serve as any delimitation on the present disclosure as well as its application or use. On the basis of the embodiments of the present disclosure, all the other embodiments obtained by those skilled in the art on the premise that no inventive effort is involved shall fall into the protection scope of the present disclosure.

Unless otherwise specified, the relative arrangements, numerical expressions and numerical values of the components and steps expounded in these examples shall not limit the scope of the present disclosure.

At the same time, it should be understood that, for ease of description, the dimensions of various parts shown in the accompanying drawings are not drawn according to actual proportional relations.

The techniques, methods, and apparatuses known to those of ordinary skill in the relevant art might not be discussed in detail. However, the techniques, methods, and apparatuses shall be considered as a part of the granted description where appropriate.

Among all the examples shown and discussed here, any specific value shall be construed as being merely exemplary, rather than as being restrictive. Thus, other examples in the exemplary embodiments may have different values.

It is to be noted that: similar reference signs and letters present similar items in the following accompanying drawings, and therefore, once an item is defined in one accompanying drawing, it is necessary to make further discussion on the same in the subsequent accompanying drawings.

The radar-based indoor localization technology in the related art is present with the following problems: some low-cost radars have limited ranging ranges so that effective ranging information cannot be obtained in large-scale scenarios; the laser SLAM may has the problem of motion degradation when faced with long-corridor environments; with a small amount of radar information, the laser SLAM is generally less likely to generate a loopback compared with the visual SLAM.

The vision sensor based indoor localization technology is present with the following problems: when visual SLAM is faced with weak texture environments such as white walls, the localization accuracy will decrease; the vision sensor is generally very sensitive to illumination, which results that the localization stability will become poor when the visual SLAM works in an environment with a significant illumination variation; the created map cannot be directly used for navigation of navigation objects.

In view of at least one of the above-described technical problems, the present disclosure provides a localization method and apparatus, a computer apparatus and a computer-readable storage medium. By fusing laser SLAM and vision SLAM, the advantages of the laser SLAM and the visual SLAM complement each other to solve the problems encountered in the working process of both the laser SLAM and the visual SLAM themselves.

FIG. 1 is a schematic view of a trajectory and a grid map that are visualized by simultaneously using the radar mapping and the vision mapping on a same navigation object, wherein, the navigation object may be a vision sensor, the radar may be a lidar, and the vision sensor may be a camera. As shown in FIG. 1, the trajectory 1 is a trajectory left by the laser SLAM; the light-color portion 4 is an occupied grid map built by the laser SLAM for navigation of a navigation object; the trajectory 2 is a trajectory left by the visual SLAM. Although both the laser SLAM and the visual SLAM describe the motion of the navigation object, due to different installation positions and angles of the radar and the vision sensors, and different environmental description scales, the trajectories localized by both of them are not coincident in the world coordinate system, and rotation and zoom will generally occur. In this way, it is impossible to provide the navigation object with a pose under the navigation map coordinate system by directly using the vision sensor localization when the radar cannot work normally.

The purpose of the present disclosure is to provide a fused laser and vision localization solution, in which it is possible to smoothly shift to another sensor for localization when only laser or vision localization encounters a problem that cannot be solved by itself.

The mainstream method for navigation of an indoor navigation object in the related art is to plan a route on the occupied grid map, which in turn controls the robot in movement. The lidar-based localization and navigation solution in the related art is usually divided into two components: mapping, and localization and navigation. The function of mapping is to create a two-dimensional occupied grid map of the environment by a lidar. The localization is implemented by matching the lidar data with the occupied grid map to obtain a current pose of the navigation object in the coordinate system of the occupied grid map. The navigation is implemented by planning a route from the current pose obtained by localization to the target point on the occupied grid map, and controlling the robot to move to the designated target point.

Figure 2:
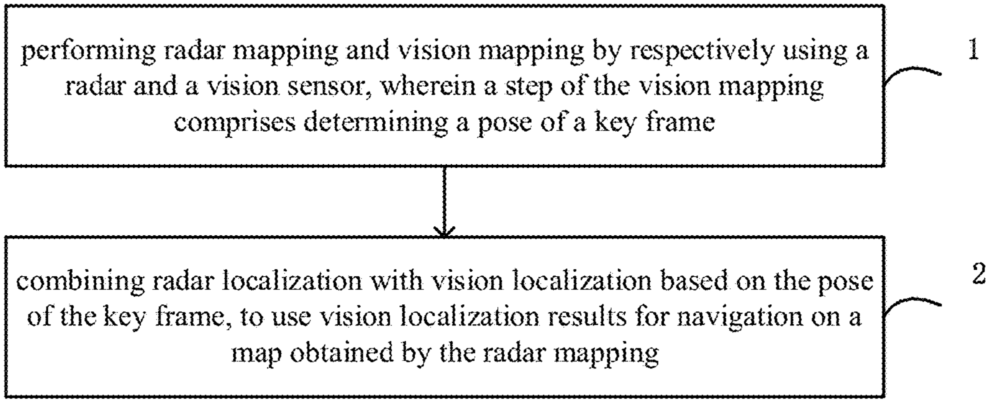
FIG. 2 is a schematic view of some embodiments of the localization method according to the present disclosure.

FIG. 2 is a schematic view of some embodiments of the localization method according to the present disclosure. Preferably, the present embodiment may be performed by the localization apparatus of the present disclosure or the computer apparatus of the present disclosure. The method may comprise step 1 and step 2.

In step 1, laser-vision fused mapping is performed.

In some embodiments of the present disclosure, step 1 may comprise: performing radar mapping and vision mapping by respectively using a radar and a vision sensor, wherein the radar may be a lidar and the vision sensor may be a camera.

In some embodiments of the present disclosure, step 1 may comprise: mapping by simultaneously using a radar and a vision sensor, wherein a grid map for localization and navigation is obtained by the radar mapping, and a vision map is obtained by the vision mapping; and binding the pose of the key frame provided by the vision mapping with a radar pose provided by the radar mapping.

Figure 3:
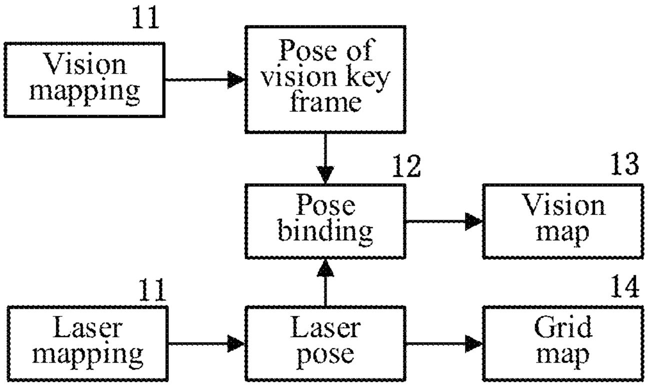
FIG. 3 is a schematic view of some embodiments of the laser-vision fused mapping method according to the present disclosure.

FIG. 3 is a schematic view of some embodiments of the laser-vision fused mapping method according to the present disclosure. As shown in FIG. 3, the laser-vision fused mapping method according to the present disclosure (for example, step 1 of the embodiment of FIG. 2) may comprise steps 11-14.

In step 11, during mapping, mapping is performed by simultaneously using the radar and the vision sensor, wherein radar mapping provides the pose of the radar and vision mapping provides the pose of the key frame, wherein the pose of the radar may be a lidar pose, the pose of the radar may be a laser pose, the radar mapping may be the laser mapping, and the radar mapping may be the lidar mapping.

In step 12, the nearest radar pose is searched for in the vicinity of each vision key frame according to time stamp for pose binding.

In step 13, when the vision map is saved, the pose of the radar corresponding to the vision key frame is saved at the same time.

In step 14, in radar mapping, the occupied grid map is saved for radar localization and navigation of a navigation object.

In step 2, laser-vision fused localization is performed. By combining radar localization with vision localization, the vision localization results may be used by the navigation object for navigation on the grid map obtained by radar mapping.

Figure 4:
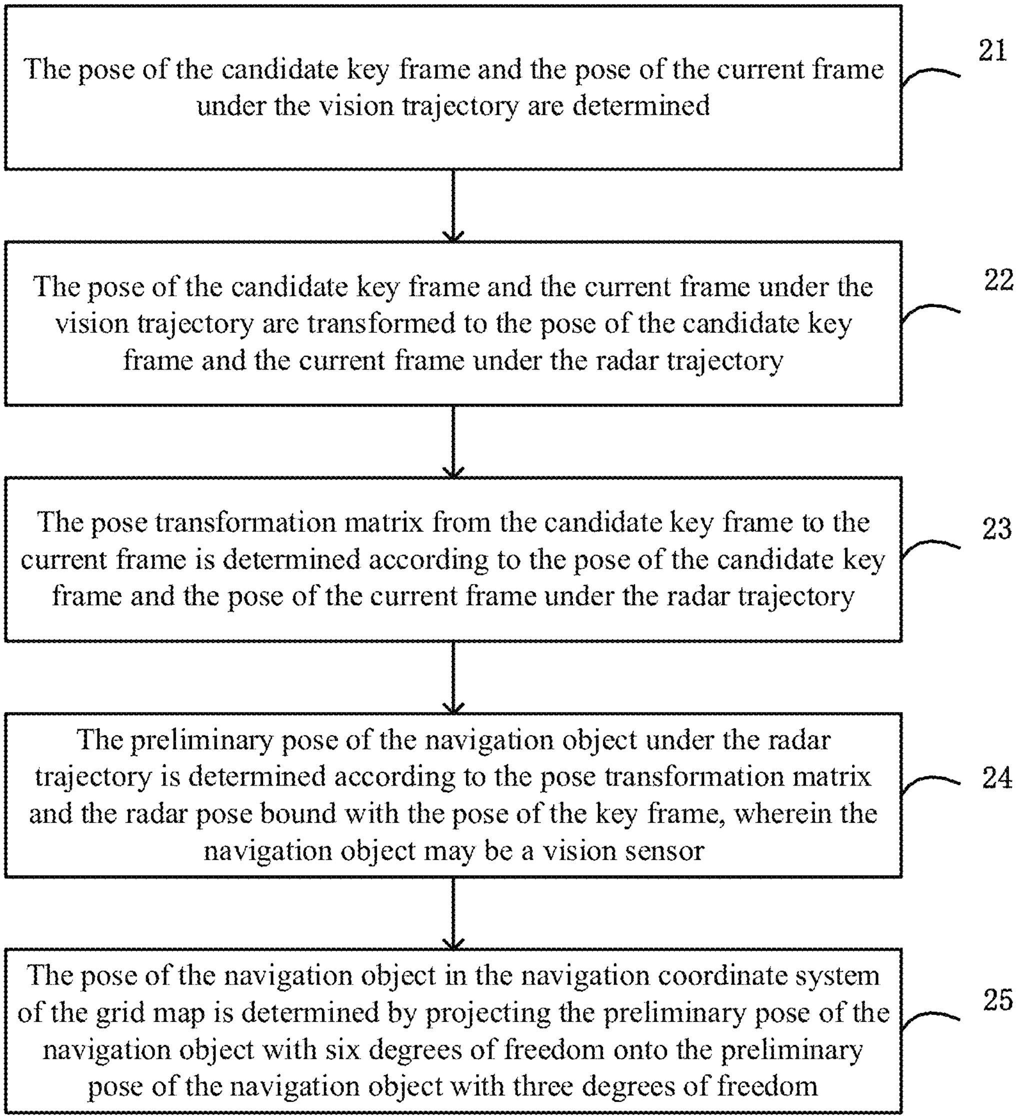
FIG. 4 is a schematic view of some embodiments of the laser-vision fused localization method according to the present disclosure.

FIG. 4 is a schematic view of some embodiments of the laser-vision fused localization method according to the present disclosure. As shown in FIG. 4, the laser-vision fused mapping method according to the present disclosure (for example, step 2 of the embodiment of FIG. 2) may comprise steps 21 to 25.

In step 21: the pose of the candidate key frame and the pose of the current frame under the vision trajectory are determined.

In step 22, the pose of the candidate key frame and the current frame under the vision trajectory are transformed to the pose of the candidate key frame and the current frame under the radar trajectory.

In step 23, the pose transformation matrix from the candidate key frame to the current frame is determined according to the pose of the candidate key frame and the pose of the current frame under the radar trajectory.

In step 24, the preliminary pose of the navigation object under the radar trajectory is determined according to the pose transformation matrix and the radar pose bound with the pose of the key frame, wherein the navigation object may be a vision sensor.

In step 25, the pose of the navigation object in the navigation coordinate system of the grid map is determined by projecting the preliminary pose of the navigation object with six degrees of freedom onto the preliminary pose of the navigation object with three degrees of freedom.

Figure 5:
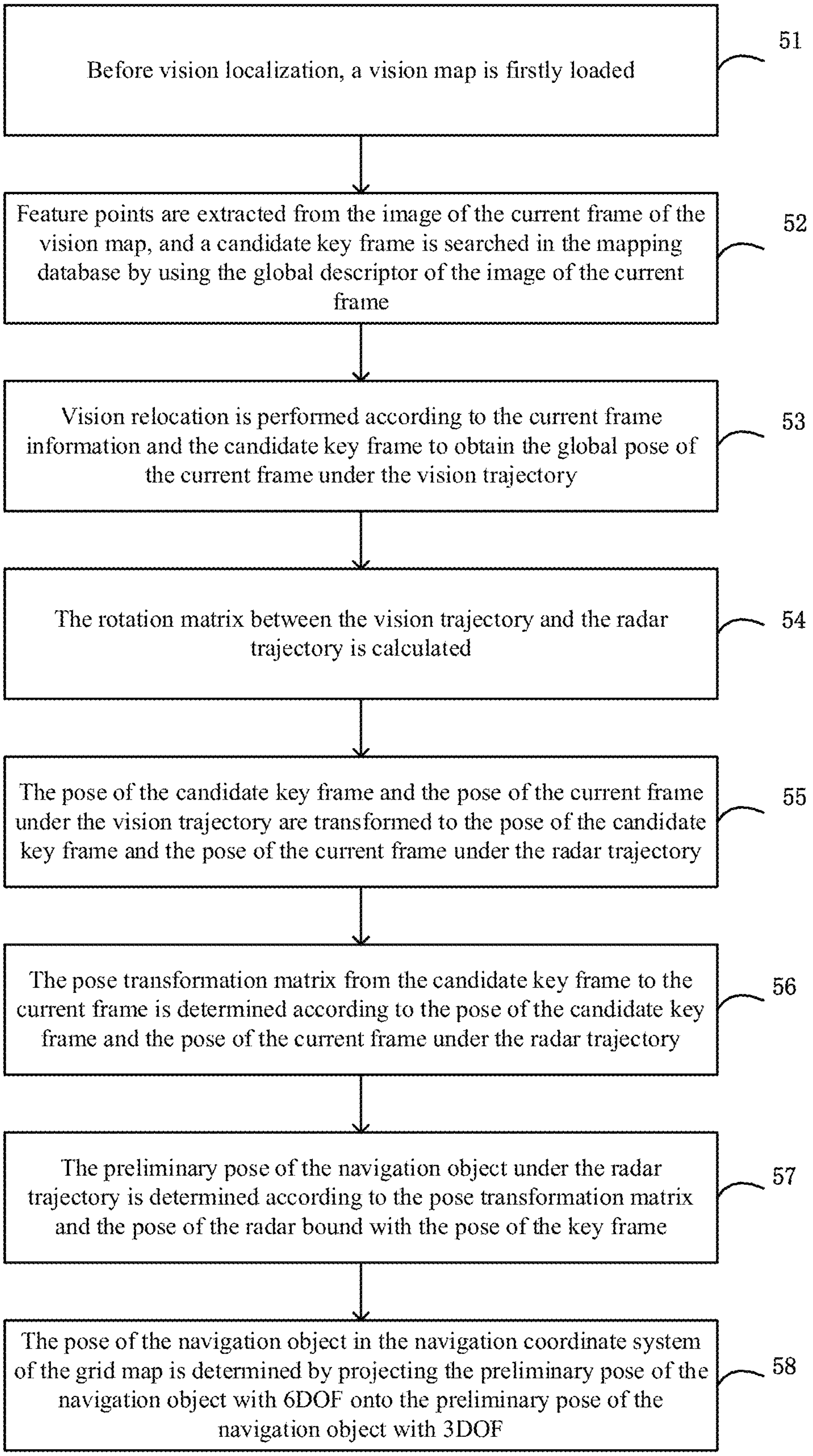
FIG. 5 is a schematic view of other embodiments of the laser-vision fused localization method according to the present disclosure.

FIG. 5 is a schematic view of other embodiments of the laser-vision fused localization method according to the present disclosure. As shown in FIG. 5, the laser-vision fused mapping method according to the present disclosure (for example, step 2 of the embodiment of FIG. 2) may comprise steps 51 to 58.

In step 51, before vision localization, a vision map is firstly loaded, wherein the vision map comprises 3D (three-dimensional) map point information of key frames of mapping, 2D (two-dimensional) point information of images and descriptor information corresponding to 2D points.

In step 52, feature points are extracted from the image of the current frame of the vision map, and a candidate key frame is searched for in the mapping database by using the global descriptor of the image of the current frame.

In step 53, vision relocation is performed according to the current frame information and the candidate key frame to obtain the global pose $$T_{vision\_cur}^{world}$$

of the current frame under the vision trajectory.

In step 54: the rotation matrix $$R_{lidar}^{vision}$$

between the vision trajectory and the radar trajectory is calculated.

In some embodiments of the present disclosure, as shown in FIG. 1, rotation and zoom are present between the vision sensor trajectory 1 and the radar trajectory 2. The rotation results from different directions of the trajectory starting in the world coordinate system which in turn results from different initializations of the vision sensor and the radar. Zoom results from the fact it is very difficult to ensure that the scale is absolutely consistent with the actual scale when the visual SLAM works on the navigation object whether it is monocular, binocular or vision IMU (Inertial measurement unit) fusion. Since the navigation object only moves in the plane, two trajectories are present with a rotation angle (rotating around the gravity direction) only at a yaw angle, and the rotation angle is substantially fixed. In the present disclosure, the angle between two trajectories is calculated by using the vision key frame position vector and the laser position vector saved during mapping, which is expressed as the rotation matrix $$R_{lidar}^{vision}.$$

In some embodiments of the present disclosure, the rotation matrix $$R_{lidar}^{vision}$$

between the vision trajectory and the radar trajectory is an extrinsic parameter rotation matrix between the vision sensor and the radar.

In step 55: the pose of the candidate key frame and the pose of the current frame under the vision trajectory are transformed to the pose of the candidate key frame and the pose of the current frame under the radar trajectory.

In some embodiments of the present disclosure, the step of transforming the pose of the candidate key frame under the vision trajectory to the pose of the candidate key frame under the radar trajectory in step 55 of FIG. 5 may comprise steps 551 to 554.

At step 551, the pose $$T_{vision\_candidate}^{world}$$

of the candidate key frame under the vision trajectory is determined according to the rotation matrix of the candidate key frame under the vision trajectory and the global position of the candidate key frame under the vision trajectory.

In some embodiments of the present disclosure, step 551 may comprise: determining the pose $$T_{vision\_candidate}^{world}$$

of the candidate key frame under the vision trajectory according to the formula (1).

$$T^{world}_{vision\_candidate} = \begin{bmatrix} R^{world}_{vision\_candidate} & t^{world}_{vision\_candidate} \\ 0 & 1 \end{bmatrix} \quad (1)$$

In the formula (1)

$$R^{world}_{vision\_candidate}$$

is the rotation matrix of the candidate key frame under the vision trajectory, and $$t^{world}_{vision\_candidate}$$

is the global position of the candidate key frame under the vision trajectory.

In step 552: the rotation martrix $$R^{world}_{lidar\_candidate}$$

of the candidate key frame under the radar trajectory is determined according to the rotation matrix $$R^{world}_{vision\_candidate}$$

of the candidate key frame under the vision trajectory and the extrinsic parameter rotation matrix $$R^{vision}_{lidar}$$

between the vision sensor and the radar.

In some embodiments of the present disclosure, step 552 may comprise: transforming the rotation matrix $$R^{world}_{vision\_candidate}$$

of the candidate key frame under the vision trajectory to the rotation matrix $$R^{world}_{lidar\_candidate}$$

of the candidate key frame under the radar trajectory by the extrinsic parameter rotation matrix $$R^{vision}_{lidar}$$

between the vision sensor and the radar according to the formula (2).

$$R^{world}_{lidar\_candidate} = R^{world}_{vision\_candidate} R^{vision}_{lidar} \quad (2)$$

In the formula (2), $$R^{vision}_{lidar}$$

is the extrinsic parameter rotation matrix between the vision sensor and the radar.

In step 553, the global position $$t^{world}_{lidar\_candidate}$$

of the candidate key frame under the radar trajectory is determined according to the global position of the candidate key frame under the vision trajectory and the rotation matrix between the vision trajectory and the radar trajectory.

In some embodiments of the present disclosure, step 553 may comprise: transforming the global position $$t^{world}_{vision\_candidate}$$

of the candidate key frame under the vision trajectory to the global position $$t^{world}_{lidar\_candidate}$$

of the candidate key frame under the radar trajectory by the rotation matrix $$R^{vision}_{lidar}$$

between two trajectories according to the formula (3).

$$t^{world}_{lidar\_candidate} = R^{vision}_{lidar} t^{world}_{vision\_candidate} \quad (3)$$

In the formula (3), $$t^{world}_{lidar\_candidate}$$

is the global position of the candidate key frame under the radar trajectory.

At step 554, the pose $$T^{world}_{lidar\_candidate}$$

of the candidate key frame under the radar trajectory is determined according to the global position of the candidate key frame under the radar trajectory and the rotation matrix of the candidate key frame under the radar trajectory.

In some embodiments of the present disclosure, step 554 may comprise: determining the pose $$T_{lidar\_candidate}^{world}$$

of the candidate key frame under the radar trajectory according to the formula (4).

$$T_{lidar\_candidate}^{world} = \begin{bmatrix} R_{lidar\_candidate}^{world} & t_{lidar\_candidate}^{world} \\ 0 & 1 \end{bmatrix} \quad (4)$$

In some embodiments of the present disclosure, the method of transforming the pose $$T_{vision\_cur}^{world}$$

of the current frame under the vision trajectory to the pose $$T_{lidar\_cur}^{world}$$

of the current frame under the radar trajectory is similar to the above-described method.

In some embodiments of the present disclosure, in step 55, the step of transforming the pose of the current frame under the vision trajectory to the pose of the current frame under the radar trajectory may comprise steps 55a to 55c.

In step 55a, the rotation matrix of the current frame under the radar trajectory is determined according to the rotation matrix of the current frame under the vision trajectory and the extrinsic parameter rotation matrix between the vision sensor and the radar.

In step 55b, the global position of the current frame under the radar trajectory is determined according to the global position of the current frame under the vision trajectory and the rotation matrix between the vision trajectory and the radar trajectory.

In step 55c, the pose of the current frame under the radar trajectory is determined according to the global position of the current frame under the radar trajectory and the rotation matrix of the current frame under the radar trajectory.

In step 56: the pose transformation matrix from the candidate key frame to the current frame is determined according to the pose of the candidate key frame and the pose of the current frame under the radar trajectory.

In some embodiments of the present disclosure, step 56 may comprise: solving the pose transformation matrix $$T_{lidar\_cur}^{lidar\_candidate}$$

from the candidate key frame to the current frame under the radar trajectory by the pose $$T_{lidar\_candidate}^{world}$$

of the candidate key frame under the radar trajectory and the pose $$T_{lidar\_cur}^{world}$$

of the current key frame under the radar trajectory according to the formula (5).

$$T_{lidar\_cur}^{lidar\_candidate} = T_{lidar\_candidate}^{world}{}^{-1} T_{lidar\_cur}^{world} \quad (5)$$

In step 57: the preliminary pose of the navigation object under the radar trajectory is determined according to the pose transformation matrix and the pose of the radar bound with the pose of the key frame.

In some embodiments of the present disclosure, step 57 may comprise that: the pose $$T_{lidar\_robot\_tmp}^{world}$$

of the navigation object under the radar trajectory may be preliminarily solved by the pose $$T_{lidar\_bind}^{world}$$

of the radar bound with the pose of the key frame and the pose transformation matrix $$T_{lidar\_cur}^{lidar\_candidate}$$

from the candidate key frame to the current frame under the radar trajectory according to the formula (6).

$$T_{lidar\_robot\_tmp}^{world} = T_{lidar\_bind}^{world} T_{lidar\_cur}^{lidar\_candidate} \quad (6)$$

In step 58, the pose of the navigation object in the navigation coordinate system of the grid map is determined by projecting the preliminary pose of the navigation object with six degrees of freedom (6DOF) onto the preliminary pose of the navigation object with three degrees of freedom (3DOF).

Since the indoor navigation object only moves in the plane, a single-bundle radar can only provide 3DOF pose, and other 3DOF errors may be introduced during the fusion process of the vision 6DOF pose and the radar 3DOF pose. In the present disclosure, the 6DOF pose $$T_{lidar\_robot\_tmp}^{world}$$

of the navigation object under the radar trajectory is projected into 3DOF, to obtain the pose $$T_{lidar\_robot}^{world}$$

of the robot under the navigation coordinate system of the grid map.

Figure 6:
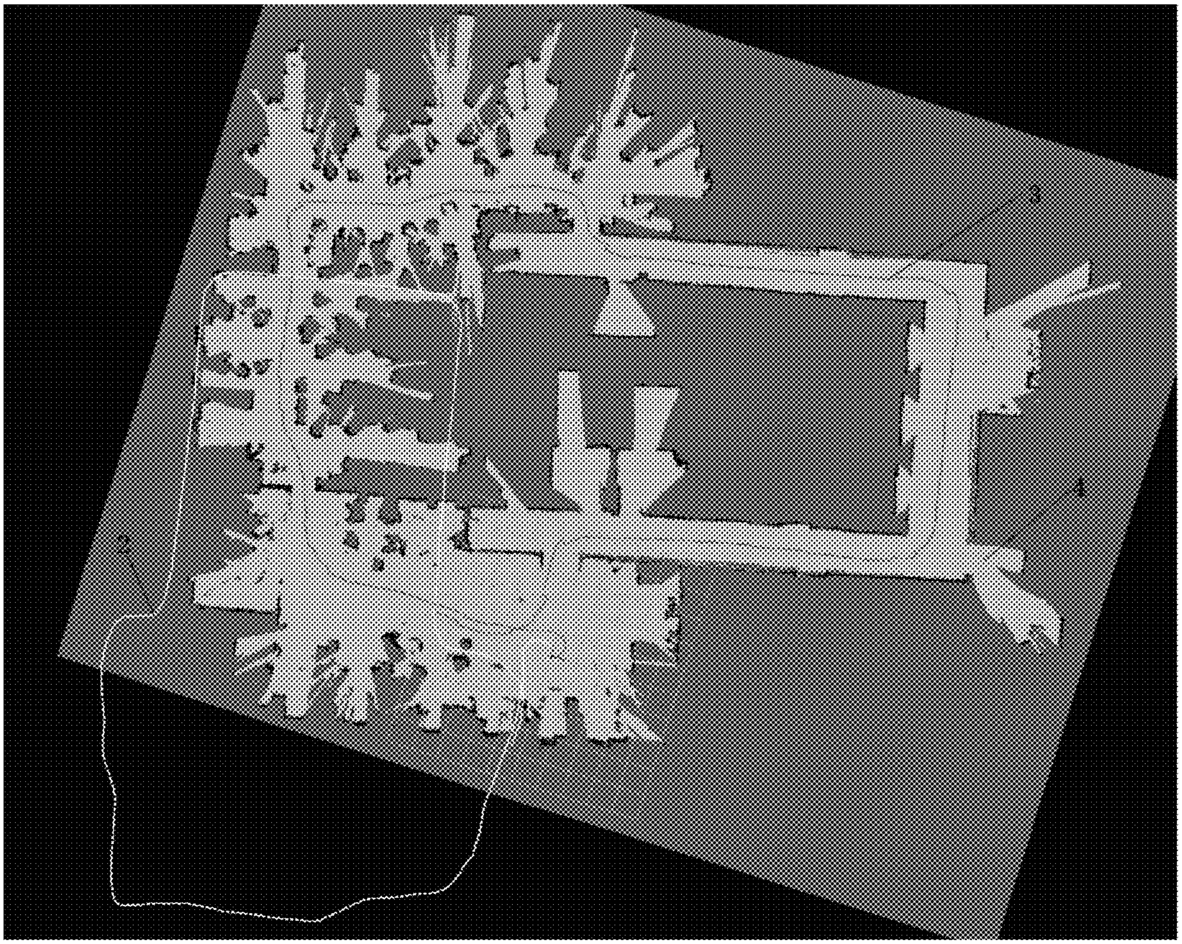
FIG. 6 is a rendering of a trajectory after fused localization according to some embodiments of the present disclosure.

FIG. 6 is a rendering of a trajectory after fused localization according to some embodiments of the present disclosure. The trajectory 3 is a trajectory obtained by vision sensor localization, and as compared with the trajectory 1 obtained by radar localization in FIG. 1, both of them are substantially consistent in rotation and scale, and the positions on the navigation grid map are also the same. The pose obtained by vision sensor localization may be directly used for navigation of a navigation object.

The localization method provided based on the above-described embodiments of the present disclosure is a laser-vision fused indoor localization method. By fusing laser SLAM and vision SLAM, the advantages of the laser SLAM and the visual SLAM complement each other, to solve the problems encountered in the working process of both the laser SLAM and the visual SLAM themselves, and a low-cost and stable localization solution is provided for the navigation object such as a mobile robot.

In the above-described embodiments of the present disclosure, the errors caused by pose fusion of different degrees of freedom are reduced during the fusion process of the laser SLAM and the visual SLAM.

Since the application of the visual SLAM on the navigation object is present with problems such as motion degradation or complex scenarios which result in the technical problem that the scale is often inconsistent with the actual scale, it is possible to keep the scale of the visual SLAM consistent with the scale of the laser SLAM by the fused solution in the above-described embodiments of the present disclosure.

The vision localization results of the above-described embodiments may be directly used by the navigation object for navigation on the grid map obtained by the laser SLAM.

The input of the laser-vision fused localization method in the above-described embodiments of the present disclosure is an image, and the output is a pose in a navigation coordinate system of the grid map.

Figure 7:
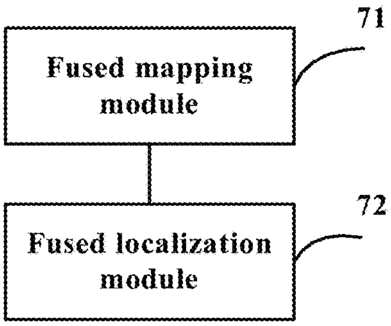
FIG. 7 is a schematic view of some embodiments of the localization apparatus of the present disclosure.

FIG. 7 is a schematic view of some embodiments of the localization apparatus of the present disclosure. As shown in FIG. 7, the localization apparatus of the present disclosure may comprise a fused mapping module 71 and a fused localization module 72.

The fused mapping module 71 is configured to perform radar mapping and vision mapping by respectively using a radar and a vision sensor, wherein a step of the vision mapping comprises determining a pose of a key frame.

In some embodiments of the present disclosure, the fused mapping module 71 may be configured to perform mapping by simultaneously using the radar and the vision sensor, wherein a map for localization and navigation is obtained by the radar mapping, and a vision map is obtained by the vision mapping; and bind the pose of the key frame provided by the vision mapping with a radar pose provided by the radar mapping.

The fused localization module 72 is configured to combine radar localization with vision localization based on the poses of the key frames, to use vision localization results for navigation on a map obtained by the radar mapping.

In some embodiments of the present disclosure, the fused localization module 72 may be configured to determine a pose of a candidate key frame and a pose of a current frame under a vision trajectory; transform the pose of the candidate key frame and the pose of the current frame under the vision trajectory to a pose of the candidate key frame and a pose of the current frame under a radar trajectory; determine a pose transformation matrix from the candidate key frame to the current frame under the radar trajectory according to the pose of the candidate key frame and the pose of the current frame under the radar trajectory; and determine a preliminary pose of a navigation object under the radar trajectory according to the pose transformation matrix and a radar pose bound with the pose of the key frame.

In some embodiments of the present disclosure, the fused localization module 72 may further be configured to determine the pose of the navigation object in a coordinate system of a grid map by projecting the preliminary pose of the navigation object with six degrees of freedom onto a preliminary pose of the navigation object with three degrees of freedom.

In some embodiments of the present disclosure, the fused localization module 72 may be configured to load a vision map; extract feature points from the image of the current frame of the vision map, and search for the candidate key frame in the mapping database according to the descriptor of the image of the current frame; and perform vision relocation according to the candidate key frame and information of feature points of the current frame, to obtain the pose of the current frame under the vision trajectory, in the case where the pose of the current frame under the vision trajectory is determined.

In some embodiments of the present disclosure, the fused localization module 72 may be configured to determine the pose of the candidate key frame under the vision trajectory according to a rotation matrix of the candidate key frame under the vision trajectory and a global position of the candidate key frame under the vision trajectory in the case where the pose of the candidate key frame under the vision trajectory is determined.

In some embodiments of the present disclosure, the fused localization module 72 may be configured to determine the rotation matrix of the candidate key frame under the radar trajectory according to the rotation matrix of the candidate key frame under the vision trajectory and the extrinsic parameter rotation matrix between the vision sensor and the radar; calculate the rotation matrix between the vision trajectory and the radar trajectory; determine the global position of the candidate key frame under the radar trajectory according to the global position of the candidate key frame under the vision trajectory and the rotation matrix between the vision trajectory and the radar trajectory; and determine the pose of the candidate key frame under the radar trajectory according to the global position of the candidate key frame under the radar trajectory and the rotation matrix of the candidate key frame under the radar trajectory, in the case where the pose of the candidate key frame under the vision trajectory is transformed to the pose of the candidate key frame under the radar trajectory.

In some embodiments of the present disclosure, the fused localization module 72 may be configured to determine the pose $$T_{vision\_candidate}^{world}$$

of the key frame under the vision trajectory according to the rotation matrix of the candidate key frame under the vision trajectory and the global position of the candidate key frame under the vision trajectory; and determine the rotation matrix $$R_{lidar\_candidate}^{world}$$

of the candidate key frame under the radar trajectory according to the rotation matrix $$R_{vision\_candidate}^{world}$$

of the candidate key frame under the vision trajectory and the extrinsic parameter rotation matrix $$R_{lidar}^{vision}$$

between the vision sensor and the radar, in the case where the rotation matrix of the candidate key frame under the radar trajectory is determined according to the rotation matrix of the candidate key frame under the vision trajectory and the extrinsic parameter rotation matrix between the vision sensor and the radar.

In some embodiments of the present disclosure, the fused localization module 72 may be configured to determine the rotation matrix of the current frame under the radar trajectory according to the rotation matrix of the current frame under the vision trajectory and the extrinsic parameter rotation matrix between the vision sensor and the radar; calculate the rotation matrix between the vision trajectory and the radar trajectory; determining the global position of the current frame under the radar trajectory according to the global position of the current frame under the vision trajectory and the rotation matrix between the vision trajectory and the radar trajectory; and determine the pose of the current frame under the radar trajectory according to the global position of the current frame under the radar trajectory and the rotation matrix of the current frame under the radar trajectory, in the case where the pose of the current frame under the vision trajectory is transformed to the pose of the current frame under the radar trajectory.

In some embodiments of the present disclosure, the localization apparatus is configured to perform the operations of implementing the localization method according to any one of the above-described embodiments (for example, any one of the embodiments of FIGS. 2 to 5).

The localization apparatus provided based on the above-described embodiments of the present disclosure is a laser-vision fused indoor localization apparatus. By fusing laser SLAM and vision SLAM, the advantages of the laser SLAM and the visual SLAM complement each other, to solve the problems encountered in the working process of both the laser SLAM and the visual SLAM themselves, and a low-cost and stable localization solution is provided for the navigation object such as a mobile robot.

In the above-described embodiments of the present disclosure, the errors caused by pose fusion of different degrees of freedom are reduced during the fusion process of the laser SLAM and the visual SLAM.

Since the application of the visual SLAM on the navigation object is present with problems such as motion degradation or complex scenarios which result in the technical problem that the scale is often inconsistent with the actual scale, it is possible to keep the scale of the visual SLAM consistent with the scale of the laser SLAM by the fused solution in the above-described embodiments of the present disclosure.

The vision localization results of the above-described embodiments may be directly used by the navigation object for navigation on the grid map obtained by the laser SLAM.

Figure 8:
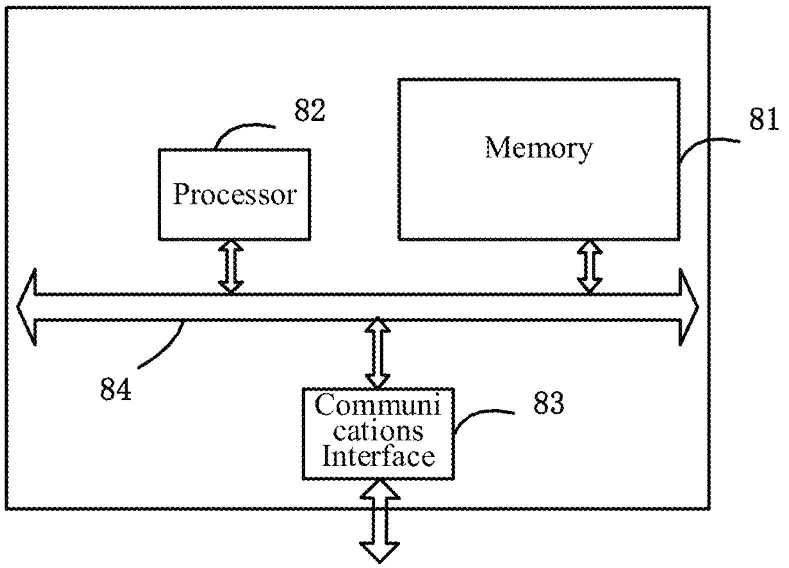
FIG. 8 is a structural schematic view of the computer apparatus according to a further embodiment of the present disclosure.

FIG. 8 is a structural schematic view of the computer apparatus according to a further embodiment of the present disclosure. As shown in FIG. 8, the computer apparatus comprises a memory 81 and a processor 82.

The memory 81 is configured to store instructions, and the processor 82 is coupled to the memory 81, and the processor 82 is configured to perform the method related to the above-described embodiments (for example the localization method according to any one of the embodiments of FIGS. 2 to 5) based on the instructions stored in the memory.

As shown in FIG. 8, the computer apparatus also comprises a communication interface 83 for information interaction with other devices. At the same time, the computer apparatus also comprises a bus 84 through which the processor 82, the communication interface 83 and the memory 81 communicate with one another.

The memory 81 may contain a high-speed RAM memory, or a non-volatile memory, for example at least one disk memory. The memory 81 may also be a memory array. The memory 81 can be further divided into blocks which may be combined into virtual volumes according to certain rules.

In addition, the processor 82 may be a central processing unit CPU, or an application specific integrated circuit ASIC, or one or more integrated circuits configured to implement the embodiments of the present disclosure.

In the computer apparatus provided based on the above-described embodiments of the present disclosure, the laser SLAM and vision SLAM are fused, and the advantages of the laser SLAM and the visual SLAM complement each other, to solve the problems encountered in the working process of both the laser SLAM and the visual SLAM themselves, and a low-cost and stable localization solution is provided for the navigation object such as a mobile robot.

In the above-described embodiments of the present disclosure, the errors caused by pose fusion of different degrees of freedom are reduced during the fusion process of the laser SLAM and the visual SLAM.

Since the application of the visual SLAM on the navigation object is present with problems such as motion degradation or complex scenarios which result in the technical problem that the scale is often inconsistent with the actual scale, it is possible to keep the scale of the visual SLAM consistent with the scale of the laser SLAM by the fused solution in the above-described embodiments of the present disclosure.

The vision localization results of the above-described embodiments may be directly used by the navigation object for navigation on the grid map obtained by the laser SLAM.

According to another aspect of the present disclosure, a non-transitory computer-readable storage medium is provided, wherein the non-transitory computer-readable storage medium stores computer instructions that, when executed by a processor, implement the localization method according to any one of the above-mentioned embodiments (for example, any one of the embodiments of FIGS. 2 to 5).

The localization apparatus provided based on the above-described embodiments of the present disclosure is a laser-vision fused indoor localization apparatus. By fusing laser SLAM and vision SLAM, the advantages of the laser SLAM and the visual SLAM complement each other, to solve the problems encountered in the working process of both the laser SLAM and the visual SLAM themselves, and a low-cost and stable localization solution is provided for the navigation object such as a mobile robot.

In the above-described embodiments of the present disclosure, the errors caused by pose fused of different degrees of freedom are reduced during the fused process of the laser SLAM and the visual SLAM.

Since the application of the visual SLAM on the navigation object is present with problems such as motion degradation or complex scenarios which result in the technical problem that the scale is often inconsistent with the actual scale, it is possible to keep the scale of the visual SLAM consistent with the scale of the laser SLAM by the fused solution in the above-described embodiments of the present disclosure.

The vision localization results of the above-described embodiments may be directly used by the navigation object for navigation on the grid map obtained by the laser SLAM.

The localization apparatus and the computer apparatus described above may be implemented as a general-purpose processor, a programmable logic controller (PLC), a digital signal processor (DSP), an application specific integrated circuit (ASIC), a field programmable gate array (FPGA) or other programmable logic devices, discrete gate or transistor logic devices, discrete hardware assemblies, or any suitable combination thereof for performing the functions described in the present application.

Hitherto, the present disclosure has been described in detail. Some details well known in the art are not described in order to avoid obscuring the concept of the present disclosure. According to the above-described description, those skilled in the art would fully understand how to implement the technical solutions disclosed here.

Those of ordinary skill in the art may understand that all or some of the steps in the above-described embodiments may be accomplished by hardware, or by programs to instruct relevant hardware. The programs may be stored in a computer-readable storage medium. The storage medium as mentioned above described may be read-only memory, magnetic disk or optical disk, and the like.

Descriptions of the present disclosure, which are made for purpose of exemplification and description, are not absent with omissions or limit the present disclosure to the forms as disclosed. Many modifications and variations are apparent for those skilled in the art. The embodiments are selected and described in order to better explain the principles and actual application of the present disclosure, and enable those skilled in the art to understand the present disclosure to design various embodiments adapted to particular purposes and comprising various modifications.

What is claimed is:

1. A localization method, comprising:

performing radar mapping and vision mapping by respectively using a radar and a vision sensor, wherein a step of the vision mapping comprises determining a pose of a key frame; and combining radar localization with vision localization based on the pose of the key frame, to use vision localization results for navigation on a map obtained by the radar mapping, wherein the combining radar localization with vision localization based on the pose of the key frame, to use vision localization results for navigation on a map obtained by the radar mapping comprises:

determining a pose of a candidate key frame and a pose of a current frame under a vision trajectory;

transforming the pose of the candidate key frame and the pose of the current frame under the vision trajectory to a pose of the candidate key frame and a pose of the current frame under a radar trajectory;

determining a pose transformation matrix from the candidate key frame to the current frame under the radar trajectory according to the pose of the candidate key frame and the pose of the current frame under the radar trajectory; and determining a preliminary pose of a navigation object under the radar trajectory according to the pose transformation matrix and a radar pose bound with the pose of the key frame.

2. The localization method according to claim 1, wherein the performing radar mapping and vision mapping by respectively using a radar and a vision sensor comprises:

performing mapping by simultaneously using the radar and the vision sensor, wherein a map for localization and navigation is obtained by the radar mapping, and a vision map is obtained by the vision mapping; and binding the pose of the key frame provided by the vision mapping with a radar pose provided by the radar mapping.

3. The localization method according to claim 1, wherein the combining radar localization with vision localization based on the pose of the key frame, to use vision localization results for navigation on a map obtained by the radar mapping further comprises:

determining the pose of the navigation object in a coordinate system of a grid map by projecting the preliminary pose of the navigation object with six degrees of freedom onto a preliminary pose of the navigation object with three degrees of freedom.

4. The localization method according to claim 1, wherein the determining the pose of the current frame under the vision trajectory comprises:

loading a vision map;

extracting feature points from an image of the current frame of the vision map;

searching for the candidate key frame in a mapping database according to a descriptor of the image of the current frame; and performing vision relocation according to the candidate key frame and information of feature points of the current frame, to obtain the pose of the current frame under the vision trajectory.

5. The localization method according to claim 1, wherein the determining the pose of the candidate key frame under the vision trajectory comprises:

determining the pose of the candidate key frame under the vision trajectory according to a rotation matrix of the candidate key frame under the vision trajectory and a global position of the candidate key frame under the vision trajectory.

6. The localization method according to claim 1, wherein the transforming the pose of the candidate key frame under the vision trajectory to the pose of the candidate key frame under the radar trajectory comprises:

determining a rotation matrix of the candidate key frame under the radar trajectory according to a rotation matrix of the candidate key frame under the vision trajectory and an extrinsic parameter rotation matrix between the vision sensor and the radar;

calculating a rotation matrix between the vision trajectory and the radar trajectory;

determining a global position of the candidate key frame under the radar trajectory according to a global position of the candidate key frame under the vision trajectory and the rotation matrix between the vision trajectory and the radar trajectory; and determining the pose of the candidate key frame under the radar trajectory according to the global position of the candidate key frame under the radar trajectory and the rotation matrix of the candidate key frame under the radar trajectory.

7. The localization method according to claim 6, wherein the determining a rotation matrix of the candidate key frame under the radar trajectory according to a rotation matrix of the candidate key frame under the vision trajectory and an extrinsic parameter rotation matrix between the vision sensor and the radar comprises:

determining the pose of the candidate key frame under the vision trajectory according to the rotation matrix of the candidate key frame under the vision trajectory and the global position of the candidate key frame under the vision trajectory; and determining the rotation matrix of the candidate key frame under the radar trajectory according to the rotation matrix of the candidate key frame under the vision trajectory and the extrinsic parameter rotation matrix between the vision sensor and the radar.

8. The localization method according to claim 1, wherein the transforming the pose of the current frame under the vision trajectory to the pose of the current frame under the radar trajectory comprises:

determining a rotation matrix of the current frame under the radar trajectory according to a rotation matrix of the current frame under the vision trajectory and an extrinsic parameter rotation matrix between the vision sensor and the radar;

calculating a rotation matrix between the vision trajectory and the radar trajectory;

determining a global position of the current frame under the radar trajectory according to a global position of the current frame under the vision trajectory and the rotation matrix between the vision trajectory and the radar trajectory; and determining the pose of the current frame under the radar trajectory according to the global position of the current frame under the radar trajectory and the rotation matrix of the current frame under the radar trajectory.

9. A computer apparatus comprising:

a memory configured to store instructions; and a processor configured to execute instructions, so that the computer apparatus performs the operations of implementing the localization method comprising:

performing radar mapping and vision mapping by respectively using a radar and a vision sensor, wherein a step of the vision mapping comprises determining a pose of a key frame; and combining radar localization with vision localization based on the pose of the key frame, to use vision localization results for navigation on a map obtained by the radar mapping, wherein the combining radar localization with vision localization based on the pose of the key frame, to use vision localization results for navigation on a map obtained by the radar mapping comprises:

determining a pose of a candidate key frame and a pose of a current frame under a vision trajectory;

transforming the pose of the candidate key frame and the pose of the current frame under the vision trajectory to a pose of the candidate key frame and a pose of the current frame under a radar trajectory;

determining a pose transformation matrix from the candidate key frame to the current frame under the radar trajectory according to the pose of the candidate key frame and the pose of the current frame under the radar trajectory; and determining a preliminary pose of a navigation object under the radar trajectory according to the pose transformation matrix and a radar pose bound with the pose of the key frame.

10. The computer apparatus according to claim 9, wherein the performing radar mapping and vision mapping by using a radar and a vision sensor comprises:

performing mapping by simultaneously using the radar and the vision sensor, wherein a map for localization and navigation is obtained by the radar mapping, and a vision map is obtained by the vision mapping; and binding the pose of the key frame provided by the vision mapping with a radar pose provided by the radar mapping.

11. The computer apparatus according to claim 9, wherein the combining radar localization with vision localization based on the pose of the key frame, to use vision localization results for navigation on a map obtained by the radar mapping further comprises:

determining the pose of the navigation object in a coordinate system of a grid map by projecting the preliminary pose of the navigation object with six degrees of freedom onto a preliminary pose of the navigation object with three degrees of freedom.

12. The computer apparatus according to claim 9, wherein the determining the pose of the current frame under the vision trajectory comprises:

loading a vision map;

extracting feature points from an image of the current frame of the vision map;

searching for the candidate key frame in a mapping database according to a descriptor of the image of the current frame; and performing vision relocation according to the candidate key frame and information of feature points of the current frame, to obtain the pose of the current frame under the vision trajectory.

13. The computer apparatus according to claim 9, wherein the determining the pose of the candidate key frame under the vision trajectory comprises:

determining the pose of the candidate key frame under the vision trajectory according to a rotation matrix of the candidate key frame under the vision trajectory and a global position of the candidate key frame under the vision trajectory.

14. The computer apparatus according to claim 9, wherein the transforming the pose of the candidate key frame under the vision trajectory to the pose of the candidate key frame under the radar trajectory comprises:

determining a rotation matrix of the candidate key frame under the radar trajectory according to a rotation matrix of the candidate key frame under the vision trajectory and an extrinsic parameter rotation matrix between the vision sensor and the radar;

calculating a rotation matrix between the vision trajectory and the radar trajectory;

determining a global position of the candidate key frame under the radar trajectory according to a global position of the candidate key frame under the vision trajectory and the rotation matrix between the vision trajectory and the radar trajectory; and determining the pose of the candidate key frame under the radar trajectory according to the global position of the candidate key frame under the radar trajectory and the rotation matrix of the candidate key frame under the radar trajectory.

15. The computer apparatus according to claim 14, wherein the determining a rotation matrix of the candidate key frame under the radar trajectory according to a rotation matrix of the candidate key frame under the vision trajectory and an extrinsic parameter rotation matrix between the vision sensor and the radar comprises:

determining the pose of the candidate key frame under the vision trajectory according to the rotation matrix of the candidate key frame under the vision trajectory and the global position of the candidate key frame under the vision trajectory; and determining the rotation matrix of the candidate key frame under the radar trajectory according to the rotation matrix of the candidate key frame under the vision trajectory and the extrinsic parameter rotation matrix between the vision sensor and the radar.

16. The computer apparatus according to claim 9, wherein the transforming the pose of the current frame under the vision trajectory to the pose of the current frame under the radar trajectory comprises:

determining a rotation matrix of the current frame under the radar trajectory according to a rotation matrix of the current frame under the vision trajectory and an extrinsic parameter rotation matrix between the vision sensor and the radar;

calculating a rotation matrix between the vision trajectory and the radar trajectory;

determining a global position of the current frame under the radar trajectory according to a global position of the current frame under the vision trajectory and the rotation matrix between the vision trajectory and the radar trajectory; and determining the pose of the current frame under the radar trajectory according to the global position of the current frame under the radar trajectory and the rotation matrix of the current frame under the radar trajectory.

17. A non-transitory computer readable storage medium, wherein the non-transitory computer readable storage medium stores computer instructions that, when executed by a processor, implement a localization method for performing the instructions comprising:

performing radar mapping and vision mapping by respectively using a radar and a vision sensor, wherein a step of the vision mapping comprises determining a pose of a key frame; and combining radar localization with vision localization based on the pose of the key frame, to use vision localization results for navigation on a map obtained by the radar mapping, wherein the combining radar localization with vision localization based on the pose of the key frame, to use vision localization results for navigation on a map obtained by the radar mapping comprises:

determining a pose of a candidate key frame and a pose of a current frame under a vision trajectory;

transforming the pose of the candidate key frame and the pose of the current frame under the vision trajectory to a pose of the candidate key frame and a pose of the current frame under a radar trajectory;

determining a pose transformation matrix from the candidate key frame to the current frame under the radar trajectory according to the pose of the candidate key frame and the pose of the current frame under the radar trajectory; and determining a preliminary pose of a navigation object under the radar trajectory according to the pose transformation matrix and a radar pose bound with the pose of the key frame.

18. The non-transitory computer readable storage medium according to claim 17, wherein the performing radar mapping and vision mapping by respectively using a radar and a vision sensor comprises:

performing mapping by simultaneously using the radar and the vision sensor, wherein a map for localization and navigation is obtained by the radar mapping, and a vision map is obtained by the vision mapping; and binding the pose of the key frame provided by the vision mapping with a radar pose provided by the radar mapping.

* * * * *